US009110152B2

(12) United States Patent
Ando et al.

(10) Patent No.: US 9,110,152 B2
(45) Date of Patent: Aug. 18, 2015

(54) METHOD OF DETERMINING THRESHOLD FOR DETECTION OF PEAK FREQUENCY IN RADAR AND OBJECT INFORMATION PRODUCING APPARATUS USING THE SAME

(75) Inventors: Takamasa Ando, Gifu (JP); Kazuma Natsume, Obu (JP)

(73) Assignee: DENSO CORPORATION, Kariya (JP)

( * ) Notice: Subject to any disclaimer, the term of this patent is extended or adjusted under 35 U.S.C. 154(b) by 618 days.

(21) Appl. No.: 13/289,077

(22) Filed: Nov. 4, 2011

(65) Prior Publication Data
US 2012/0112955 A1 May 10, 2012

(30) Foreign Application Priority Data

Nov. 5, 2010 (JP) .................................. 2010-248903

(51) Int. Cl.
G01S 7/40 (2006.01)
G01S 7/35 (2006.01)
G01S 13/34 (2006.01)
G01S 13/93 (2006.01)

(52) U.S. Cl.
CPC ............... *G01S 7/4056* (2013.01); *G01S 7/352* (2013.01); *G01S 13/345* (2013.01); *G01S 13/931* (2013.01)

(58) Field of Classification Search
CPC ..... G01S 13/931; G01S 7/023; G01S 7/4056; G01S 7/352; G01S 13/345
USPC ........................................... 342/70, 159, 168
See application file for complete search history.

(56) References Cited

U.S. PATENT DOCUMENTS

| 5,717,399 | A | * | 2/1998 | Urabe et al. ..................... 342/70 |
| 7,339,518 | B2 | * | 3/2008 | Natsume et al. ................. 342/70 |
| 7,456,781 | B2 | * | 11/2008 | Honda ........................... 342/173 |
| 7,463,181 | B2 | * | 12/2008 | Wintermantel ................. 342/27 |
| 8,203,481 | B2 | * | 6/2012 | Wintermantel et al. ....... 342/112 |
| 2004/0174293 | A1 | | 9/2004 | Isaji |

(Continued)

FOREIGN PATENT DOCUMENTS

| CN | 101162267 | 4/2008 |
| JP | 09-090023 | 4/1997 |
| JP | 11-271431 | 10/1999 |

(Continued)

OTHER PUBLICATIONS

Office Action issued Aug. 28, 2012 in corresponding Japanese Application No. 2010-248903 with English translation.

(Continued)

*Primary Examiner* — John B Sotomayor
*Assistant Examiner* — Marcus Windrich
(74) *Attorney, Agent, or Firm* — Harness, Dickey & Pierce, PLC

(57) ABSTRACT

A peak detecting threshold determining method is provided which determines a peak detecting threshold which is used by an FMCW radar in detecting a peak frequency component which appears as representing a target object in a frequency spectrum. A CW radar wave is transmitted to produce a CW noise spectrum. An offset is added to frequency components in a high-frequency region of the CW noise spectrum to define a first distribution as a value of the peak detecting threshold. This enables the value of the peak detecting threshold in the high-frequency region to be determined with high precision by reflecting a receiver noise containing a leakage noise.

12 Claims, 8 Drawing Sheets

(56) References Cited

U.S. PATENT DOCUMENTS

2006/0007036 A1* 1/2006 Natsume et al. ............... 342/70
2012/0026031 A1* 2/2012 Goodman .................... 342/159

FOREIGN PATENT DOCUMENTS

| JP | 2001-091642 | 4/2001 |
| JP | 2001-166035 | 6/2001 |
| JP | 2004-264258 | 9/2004 |
| JP | 2007-086006 | 4/2007 |
| JP | 4408638 | 11/2009 |

OTHER PUBLICATIONS

Office Action issued Jan. 22, 2013 in corresponding Japanese Application No. 2010-248903 with English translation (references cited in OA were previously disclosed on Sep. 27, 2012).

Office Action issued Oct. 18, 2013 in corresponding Chinese Application No. 201110372702.9 (with English translation).

* cited by examiner

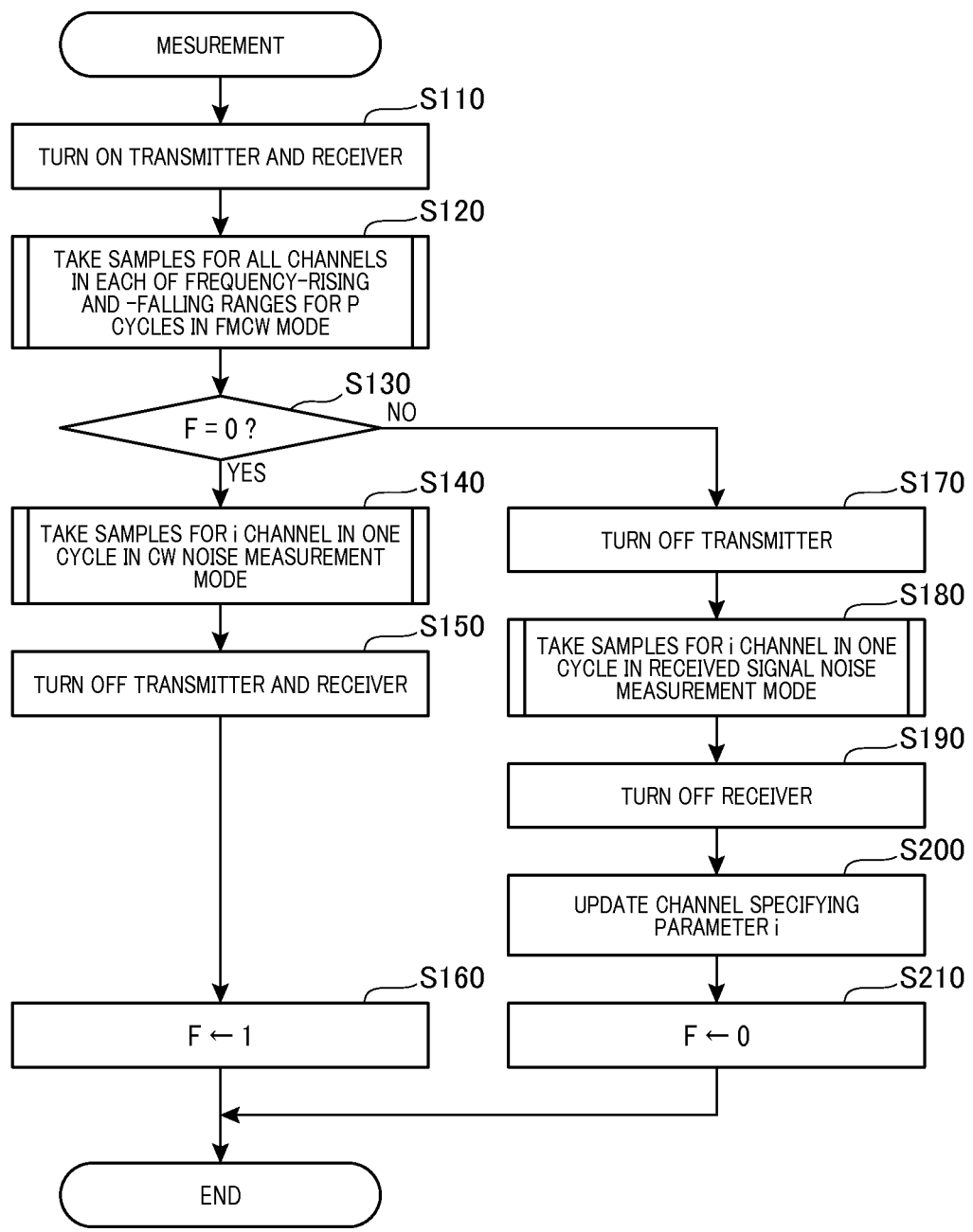

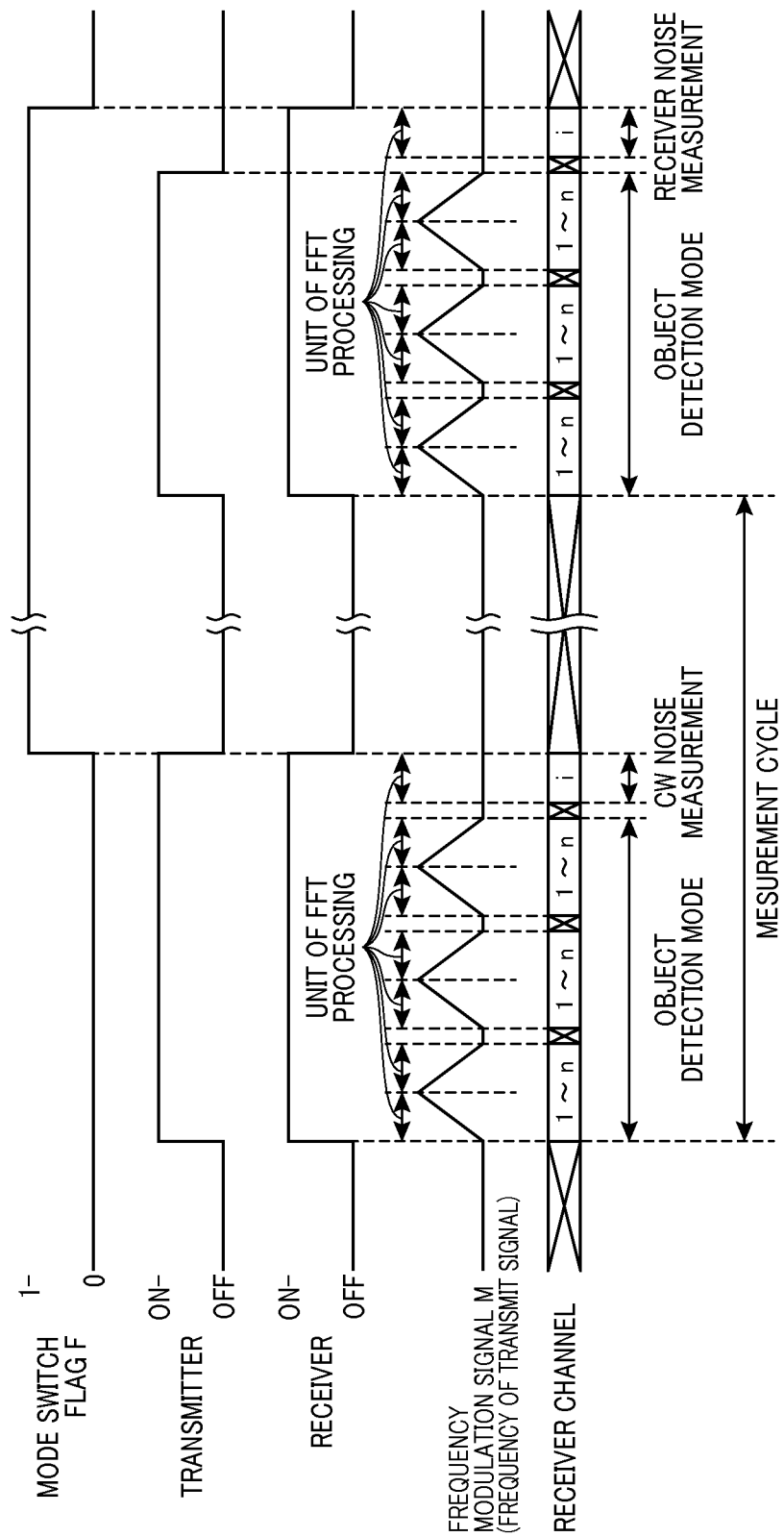

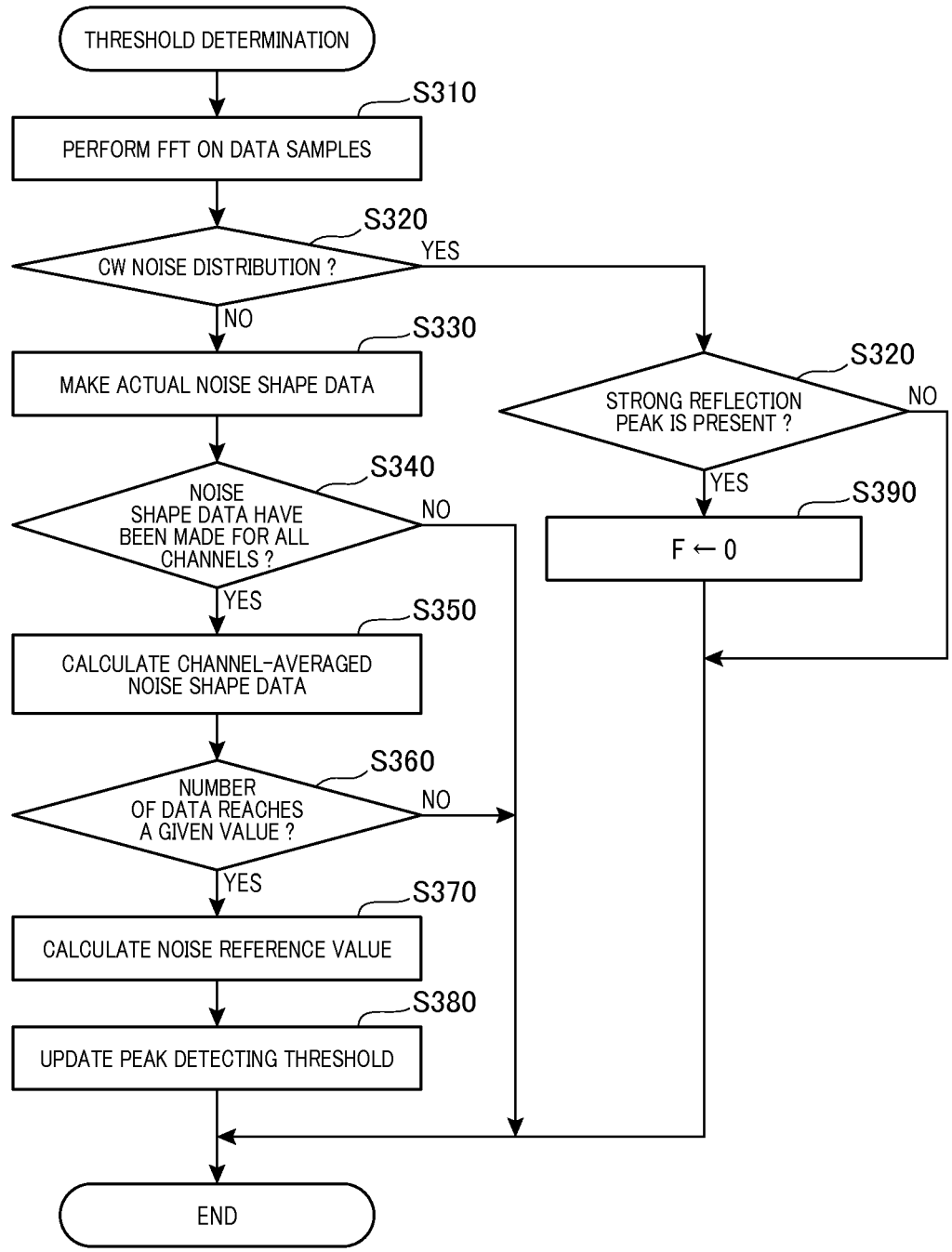

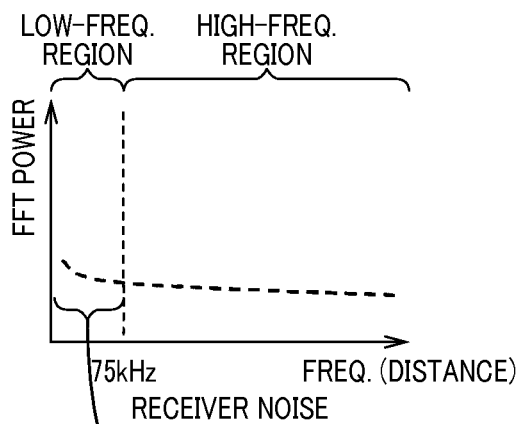
FIG.5(a)
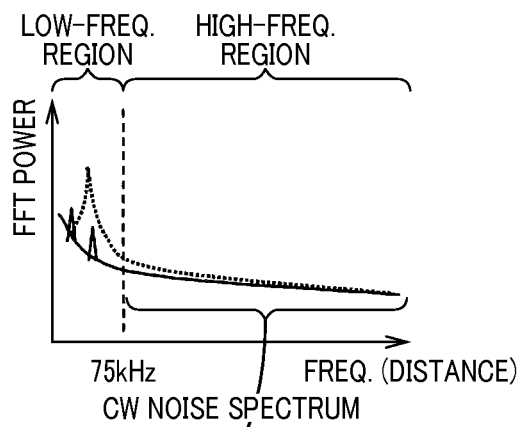
FIG.5(b)
FIG.5(c)
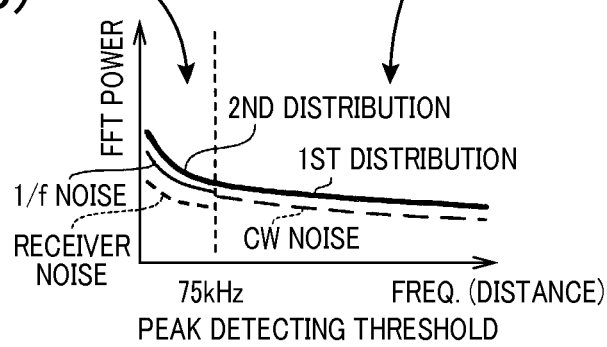

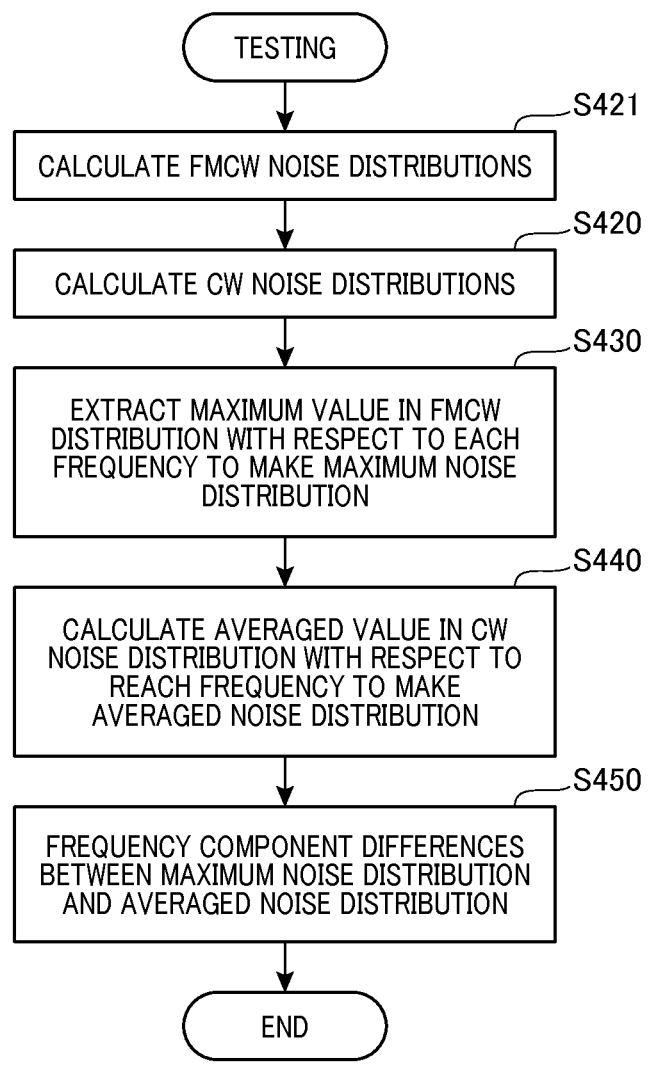

FMCW WAVE

CW WAVE

METHOD OF DETERMINING THRESHOLD FOR DETECTION OF PEAK FREQUENCY IN RADAR AND OBJECT INFORMATION PRODUCING APPARATUS USING THE SAME

CROSS REFERENCE TO RELATED DOCUMENT

The present application claims the benefit of priority of Japanese Patent Application No. 2010-248903 filed on Nov. 5, 2010, the disclosure of which is incorporated herein by reference.

BACKGROUND OF THE INVENTION

1. Technical Field

The present invention relates generally to a threshold detecting method which performs frequency analysis (e.g., an FFT algorithm) on a beat signal, as produced in a FMCW (Frequency Modulated Continuous Wave) radar, and determines a threshold value for use in detecting a peak frequency component arising from an echo of a transmitted radar wave from a target object, an object information producing apparatus designed to use the threshold detecting method to produce information about a target object tracked by a radar, and a computer readable program including instructions to perform the threshold detecting method.

2. Background Art

Japanese Patent First Publication No. 11-271431 discloses an FMCW radar system which frequency-analyzes a beat signal, as produced by mixing a transmitted signal and an echo thereof from a target object, and detects or extracts a peak frequency component which has arisen from the echo from the target object from results of the frequency analysis using a peak detecting threshold. This publication also teaches a technique of determining the peak detecting threshold based on a frequency spectrum created by removing the peak frequency component representing the target object from frequency components derived by frequency-analyzing the previous beat signal.

Japanese Patent First Publication No. 2001-91642 teaches a technique of calculating a moving average of a plurality of frequency components around a specified frequency component (i.e., a specified frequency BIN) to determine the peak detecting threshold.

Each of the above techniques is to determine the peak detecting threshold using the results of the frequency analysis from which the peak frequency component is required to be extracted, thus resulting in a great change in the peak detecting threshold with a change in environmental condition, which leads to instability in detecting the target object.

Techniques are also known of estimating the thermal noise generated by the radar receiver and calculating the peak detecting threshold based on the thermal noise. Specifically, the level of a signal acquired in the receiver when the receiver is on, but the transmitter is off is defined as a noise level. The peak detecting threshold is determined based on the noise level.

As one source of noises contained in a signal received by the radar, a leakage noise that is noise which leaks from the transmitter and is then added to the received signal duel to a lack in isolation between the transmitter and the receiver. Typical radars are, therefore, designed to have isolation between the transmitter and the receiver so that the leakage noise is buried in a receiver noise that is noise generated by the receiver itself to an extent that it may ignored.

However, in recent years, antennas which are low in transmitter-to-receiver isolation may have been used in development of downsizing the antenna of the radar or reducing the production cost thereof. Use of such a type of antenna may result in generation of leakage noise which is too great in level to be ignored as compared with the receiver noise. Additionally, use of receivers which are lower in receiver noise level for improving the performance of the radar may also cause the level of the leakage noise to be too great to be ignorable relative to the receiver noise.

The above described technique of deactivating the transmitter to measure the noise level has the disadvantage that it is impossible to reflect the effects of the leakage noise on the noise level, thus resulting in a decrease in accuracy in calculating the peak detecting threshold, which leads to inaccuracy in detecting the target object.

SUMMARY

It is an object to provide a method of determining a peak detecting threshold for use in searching a peak frequency component, as created by frequency-analyzing a radar echo, to detect a target object generating the radar echo with high precision by reflecting the leakage noise.

It is another object to provide an object information producing apparatus designed to ensure enhanced accuracy in producing information about a target object.

According to one aspect of an embodiment, there is provided a method which determines a peak detecting threshold which is used by an FMCW radar in detecting a peak frequency component which appears as representing a target object in a frequency spectrum derived by frequency-analyzing a first beat signal that is a beat signal developed by an FMCW radar wave transmitted from a transmitter of the radar and an echo of the FMCW radar wave from the target object. The method comprises: (a) producing a second beat signal that is a beat signal created by transmitting a CW radar wave through the transmitter and receiving an echo thereof; (b) frequency-analyzing the second beat signal to create a frequency spectrum as a CW noise spectrum and defining, as a CW upper limit component, a peak frequency component which appears in the CW noise spectrum and arises from the echo of the CW radar wave from an object having a predetermined upper limit of a relative speed to the radar; (c) adding an offset to frequency components in a high-frequency region of the CW noise spectrum which is higher than a border frequency that is the CW upper limit component to define a first distribution; and (d) determining the first distribution as a value of the peak detecting threshold.

When the CW radar wave is transmitted, it causes the peak of Doppler frequency to appear as a function of a speed of the radar relative to the target object reflecting the CW radar wave within the frequency spectrum, as derived by frequency-analyzing the beat signal regardless of the distance to the target object. For instance, when the frequency of the CW radar wave 76.5 GHz, and the relative speed is 300 km/h, the frequency of the CW upper limit component is 43 kHz. There are no peak frequency components higher than 43 kHz in the frequency spectrum.

The high-frequency region of the CW noise spectrum where the peak frequency component will not appear, therefore, represents the level of the noise floor of the receiver noise containing the leakage noise, as described above. The use of the high-frequency region of the CW noise spectrum, thus, enhances the accuracy in determining the peak detecting threshold.

In light of a variation in level of the CW noises resulting from the random noise, the offset is preferably set to a maximum level of such a variation and may be determined in the following manner.

The transmitter and the receiver are placed in an echo-free environment. The FMCW radar wave is transmitted. An echo of the FMCW radar wave is received to produce and frequency-analyzes a beat signal to develop a frequency spectrum as an FMCW noise spectrum. Peak levels in the FMCW noise spectrum are held at respective frequencies. The CW radar waves are transmitted in the echo-free environment. Echoes of the CW radar waves are received to produce and frequency-analyzing beat signals to develop a plurality of frequency spectrums as CW noise spectrums. Averaged values in the CW noise spectrums are calculated at respective frequencies. A difference between each of the peak levels and one of the averaged values is determined at the respective frequencies as the offset.

The peak frequency component may appear, as described above, within a low-frequency region of the CW noise spectrum. It is, therefore, impossible to use the low-frequency region in determining the value of the peak detecting threshold. Consequently, the value of the peak detecting threshold within the low-frequency region may be fixed taking into account the 1/f noise or be determined in the following manner.

The transmitter is deactivated while the receiver is activated to produce a beat signal as a third beat signal. The third beat signal is frequency-analyzed to create a frequency spectrum as a receiver noise spectrum. The 1/f noise is added to the receiver noise spectrum in the low-frequency region lower than the CW upper limit component. The level of the receiver noise spectrum to which the 1/f noise is added is adjusted to develop a second distribution successively continuing to the first distribution. The second distribution is determined as the value of the peak detecting threshold in the low-frequency region.

Specifically, the second distribution is made by a combination of the receiver noise spectrum and the 1/f noise, so that the shape of the second distribution approximates an actual noise spectrum. The adjustment of the level of the receiver noise spectrum reflects the leakage noise on the second distribution.

According to another aspect of an embodiment, there is provided an object information producing apparatus which comprises: (a) first analyzing means for frequency-analyzing a first beat signal that is a beat signal created by transmitting an FMCW radar wave through a transmitter and receiving an echo of the FMCW radar wave through a receiver of a radar to produce a frequency spectrum; (b) peak detecting means for detecting a peak frequency component which is greater than a given peak detecting threshold from the frequency spectrum, as derived by the first analyzing means; (c) second analyzing means for frequency-analyzing a second beat signal that is a beat signal created by transmitting a CW radar wave through the transmitter and receiving an echo of the CW radar wave through the receiver to produce a frequency spectrum as a CW noise spectrum; (d) threshold determining means for determining the peak detecting threshold based on the CW noise spectrum, the threshold determining means defining, as a CW upper limit component, a peak frequency component which appears in the CW noise spectrum and arises from the echo of the CW radar wave from an object having a predetermined upper limit of a relative speed to the radar, the threshold determining means adding an offset to frequency components in a high-frequency region of the CW noise spectrum which is higher than the CW upper limit component to define a first distribution, the threshold determining means determining the first distribution as a value of the peak detecting threshold; and (e) target object information producing means for producing information about a target object reflecting the FMCW radar wave based on the peak frequency component, as detected by the peak detecting means.

Accordingly, in the high-frequency region, the value of the peak detecting threshold can be determined with high precision by reflecting the receiver noise containing the leakage noise. This results in enhanced accuracy in producing the information about the target object in the high-frequency region (i.e., a middle radar range).

The object information producing apparatus may also include third analyzing means for deactivating the transmitter while activating the receiver to produce a beat signal as a third beat signal and frequency-analyzing the third beat signal to create a frequency spectrum as a receiver noise spectrum. The threshold determining means adds the 1/f noise to the receiver noise spectrum in a low-frequency region lower than the CW upper limit component, adjusts a level of the receiver noise spectrum to which the 1/f noise is added to develop a second distribution successively continuing to the first distribution, and determines the second distribution as a value of the peak detecting threshold in the low-frequency region. This results in enhanced accuracy in creating the peak frequency component in the low-frequency region (i.e., a short radar range), thereby producing the information about the target object correctly in the low-frequency region.

The second analyzing means may transmit the CW radar wave a given number of times to produce a plurality of the CW noise spectrums and average frequency components of the CW noise spectrums to develop a frequency spectrum which is used in the peak detecting threshold. When one of the CW noise spectrums includes a peak frequency component whose lower skirt extends over the high-frequency region, that one of the CW noise spectrums may be excluded from the frequency spectrum used in the peak detecting threshold.

A determination of whether the peak frequency component has the lower skirt which extends into the high-frequency region or not may be made by using a logic value representing the size of the lower skirt resulting from the phase noise to determine, as a strong reflection threshold, a maximum level of the peak frequency component whose portion of the lower skirt extending into the high-frequency region is lower than a permissible value, and determining whether there is the peak frequency component or not which exceeds the strong reflection threshold.

When there is a large reflective object in an actual environment, the phase noise-caused lower skirt of the peak frequency component appearing in the low-frequency region of the CW nose spectrum may extend inside the high-frequency region, so that the first distribution, that is, the level of the peak detecting threshold is elevated, thus resulting in deterioration in ability to calculating the border frequency. The object information producing apparatus, however, avoids such a problem.

According to the third aspect of an embodiment, there is provided a non-transitory computer readable storage medium storing a computer program which is used by an FMCW radar in detecting a peak frequency component which appears as representing a target object in a frequency spectrum derived by frequency-analyzing a first beat signal that is a beat signal developed by an FMCW radar wave transmitted from a transmitter of the radar and an echo of the FMCW radar wave from the target object, the program comprising instructions to perform the steps of: (a) determining a peak detecting threshold which is used by an FMCW radar in detecting a peak frequency component which appears as representing a target object in a frequency spectrum derived by frequency-analyzing a first beat signal that is a beat signal developed by an FMCW radar wave transmitted from a transmitter of the radar and an echo of the FMCW radar wave from the target object; (b) producing a second beat signal that is a beat signal created by transmitting a CW radar wave through the transmitter and receiving an echo thereof; (c) frequency-analyzing the second beat signal to create a frequency spectrum as a CW noise spectrum and defining, as a CW upper limit component, a peak frequency component which appears in the CW noise spectrum and arises from the echo of the CW radar wave from an object having a predetermined upper limit of a relative speed to the radar; (d) adding an offset to frequency components in a high-frequency region of the CW noise spectrum which is higher than the CW upper limit component to define a first distribution; and (e) determining the first distribution as a value of a peak detecting threshold.

The instructions may also include steps of transmitting the FMCW radar wave; receiving an echo of the FMCW radar wave to produce and frequency-analyzing a beat signal to develop a frequency spectrum as an FMCW noise spectrum when the transmitter and the receiver is placed in an echo-free environment; holding peak levels in the FMCW noise spectrum at respective frequencies; transmitting the CW radar waves in the echo-free environment; receiving echoes of the CW radar waves to produce and frequency-analyzing beat signals to develop a plurality of frequency spectrums as CW noise spectrums; calculating averaged values in the CW noise spectrums at respective frequencies; and determining a difference between each of the peak levels and one of the averaged values at the respective frequencies as the offset.

The instructions may further include steps of deactivating the transmitter while activating the receiver to produce a beat signal as a third beat signal; frequency-analyzing the third beat signal to create a frequency spectrum as a receiver noise spectrum; adding a 1/f noise to the receiver noise spectrum in a low-frequency region lower than the CW upper limit component; adjusting a level of the receiver noise spectrum to which the 1/f noise is added to develop a second distribution successively continuing to the first distribution; and determining the second distribution as a value of the peak detecting threshold in the low-frequency region.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2 is a flowchart of a measurement program executed by the radar system, as illustrated in FIG. 1;

FIG. 3 is a time chart which demonstrates an operation of the radar system of FIG. 1 in an object detection mode;

FIG. 4 is a flowchart of a threshold determining program to be executed by the radar system of FIG. 1;

FIG. 5(a) is a view which illustrates an example of the receiver noise spectrum, as made by fast Fourier transforming data samples acquired in a receiver noise measurement operation;

FIG. 5(b) is a view which illustrates an example of a CW noise spectrum, as made by fast Fourier transforming data samples acquired in a CW noise measurement operation;

FIG. 5(c) is a view which illustrates an example of peak detecting thresholds;

FIG. 6 is a flowchart of a testing program to be executed by the radar system of FIG. 1;

DESCRIPTION OF THE PREFERRED EMBODIMENTS

Figure 1:
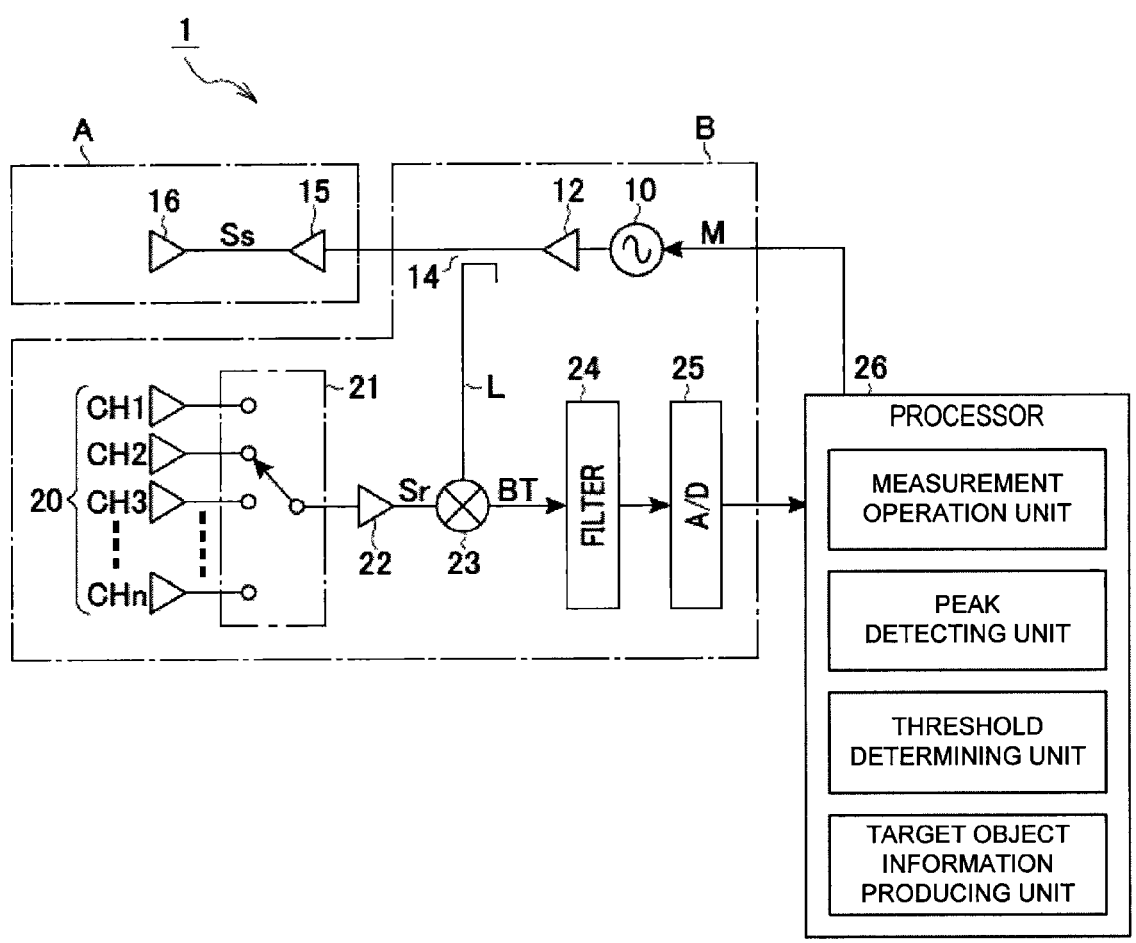
FIG. 1 is a block diagram which shows a radar system according to an embodiment of the present invention.

Referring now to the drawings, particularly to FIG. 1, there is shown a radar system 1 according to the present invention which may be employed in automotive vehicles to detect or track a target object present in a frontal detectable range. The radar system 1 is designed as a FMCW (Frequency Modulated Continuous Wave) type of millimeter-wave radar which transmits a frequency-modulated radar wave in a millimeter band, receives a return thereof, and identifies a target such as a preceding vehicle or a roadside object to produce information about the target.

The radar system 1 includes an oscillator 10, an amplifier 12, a divider (also called a splitter) 14, an amplifier 15, a transmitter antenna 16, and a receiver antenna assembly 20. The oscillator 10 produces a high-frequency signal in a millimeter band (e.g., 76.5 GHz) and changes an oscillating frequency as a function of the level of a modulation signal M. The amplifier 12 amplifies the high-frequency signal, as produced by the oscillator 10. The divider 14 splits in power the output of the amplifier 12 into a transmit signal Ss and a local signal L. The amplifier 15 amplifies the transmit signal Ss. The transmitter antenna 16 outputs the output of the amplifier 15 in the form of a radar wave. The receiver antenna assembly 20 is made up of n (=an integer more than one) antennas (which will also be referred to as receiver antennas or channels CH1 to CHn below) each of which receives an echo of the radar wave from an object.

The radar system 1 also includes a receiver switch 21, an amplifier 22, a mixer 23, a filer 24, an A/D converter 25, and a signal processing unit 26. The receiver switch 21 works to select one of the receiver antennas CH1 to CHn in sequence and transmit a signal Sr, as received by the selected one of the receiver antennas CH1 to CHn, to the amplifier 22. The amplifier 22 amplifies the received signal Sr and outputs it to the mixer 23. The mixer 23 mixes the received signal Sr with the local signal L to produce the so-called beat signal BT. The filter 24 removes unwanted components from the beat signal BT. The A/D converter 25 samples an output of the filter 24 and converts it into a digital form. The signal processing unit 26 controls the sampling of the beat signal BT through the A/D converter 25 and produces information on the target which has reflected the radar wave transmitted from the transmitter antenna 16.

Basically, component parts of the radar system 1 other than the signal processing unit 26 are divided into two sections A and B. Specifically, the first section A includes the amplifier 15 and the transmitter antenna 16. The section B includes the other component parts. The signal processing unit 26 controls supplies of electric power to the sections A and B separately. The section A serves as a transmitter along with the signal processing unit 26. The section B serves as a receiver along with the signal processing unit 26.

Operation of Radar System

When the radar system 1 is activated, the oscillator 10 oscillates at a frequency, as specified by the modulation signal M. The amplifier 12 amplifies the high-frequency signal, as produced by the oscillator 10. The divider 14 splits in power the high-frequency signal, as amplified by the amplifier 12, into the transmit signal Ss and the local signal L. The transmit signal Ss is then amplified by the amplifier 15 and outputted from the transmitter antenna 16 in the form of the radar wave.

A return of the radar wave from the target object is received by all the receiver antennas CH1 to CHn each of which will also be generally referred to as a receiver antenna or a receiver channel CHi (i=1 to n). The signal Sr, as received by the receiver antenna CHi selected by the receiver switch 21, is amplified by the amplifier 22 and then sent to the mixer 23. The mixer 23 mixes the received signal Sr with the local signal L, as transmitted from the divider 14, to create the beat signal BT. The beat signal BT is filtered by the filter 24, sampled by the A/D converter 25, and then outputted to the signal processing unit 26.

The signal processing unit 26 produces the modulation signal M whose level changes in the form of a triangular wave to create an FMCW radar wave which is frequency-modulated to have a frequency increasing and decreasing, i.e., sweeping upward and downward cyclically in a linear fashion or whose level is kept constant to create a CW radar wave having a fixed frequency. Note that period of time for which the frequency of the radar wave sweeps upward and downward and ranges thereof will also be referred to as modulated frequency-rising and -falling times and ranges below.

The signal processing unit 26 is operable to stop supplying the electric power to the section A to disable the transmitter function of the radar system 1 while enabling the receiver function thereof.

Signal Processing

The signal processing unit 26 is implemented by a typical microcomputer made up of a CPU, a ROM, a RAM, etc. and equipped with an arithmetic processing unit such as a DSP to perform the fast Fourier transform (FFT) on radar data acquired through the A/D converter 25.

The ROM stores therein programs to be executed by the CPU and parameters for use in executing the programs.

Specifically, the CPU performs a measurement operation to collect data required to detect the target object tracked by the radar system 1, an object information producing operation to produce information about the target object, and a threshold determining operation to determine a peak detecting threshold(s) for use in extracting a given signal component(s) from the radar wave reflected from the target object. The parameters used in executing such operations include defaults of the peak detecting thresholds, an offset(s), and a strong reflection threshold(s), as will be described later in detail.

Measurement Operation

FIG. 2 is a flowchart of a measurement program to be executed by the signal processing unit 26 at a given interval (e.g., 100 ms) after the signal processing unit 26 is powered on, and a given initialization process is performed. The initialization process is to reset a mode switch flag F to zero and a channel specifying parameter i to one which will be described below in detail.

After entering the program, the routine proceeds to step S110 wherein the electric power is supplied to both the sections A and B of the radar system 1 to activate the transmitter and the receiver.

The routine proceeds to step S120 wherein an object detection mode is entered to transmit the FMCW radar wave through the transmitter antenna 16 and receive an echo of the FMCW radar wave. The beat signal BT (which will also be referred to as a first beat signal below) is produced by the signal Sr (i.e., an echo of the FMCW radar wave) received by each of the receiver antennas CH1 to CHn.

Specifically, the object detection mode is to output the modulation signal M whose level changes in the form of a triangular wave for producing the FMCW radar wave P times (P is an integer more than one) at a time interval that is greater than or equal to the amount of time (i.e., a round trip time) required by the radar wave to travel to and return from a maximum detectable distance (i.e., the farthest end of the radar range). The receiver antennas CH1 to CHn are also switched from one to another in sequence in a frequency-modulation cycle which corresponds to a period of time that is the sum of the modulated frequency-rising and -falling times so that the A/D converter 25 samples the beat signal BT a given number of times (e.g., 256 samples per channel in each of the modulated frequency-rising and -falling times).

The routine proceeds to step S130 wherein it is determined whether the mode switch flag F is set to zero or not. If a YES answer is obtained (F=0), then the routine proceeds to step S140 wherein a CW noise measurement mode is entered to transmit the CW radar wave through the transmitter antenna 16 and sample the resulting beat signal BT (which will also be referred to as a second beat signal below), as produced by the signal Sr received by one of the receiver antennas CHn (i.e., the receiver antenna CHi) which is specified by the channel specifying parameter i.

Specifically, the CW noise measurement mode is to output the modulation signal M whose level is kept constant to create the CW radar wave, continue to select only one of the receiver antennas CH1 to CHn, as specified by the channel specifying parameter i, for half the frequency-modulation cycle (i.e., a duration of one cycle of the CW radar wave), and samples the beat signal BT a given number of times (e.g. 256 times) through the A/D converter 25.

The routine proceeds to step 150 wherein the supply of electric power to the sections A and B is cut to disable the transmitter function and the receiver function of the radar system 1. The routine proceeds to step S160 wherein the mode switch flag F is set to zero. The routine then terminates.

If a NO answer is obtained in step S130 meaning that the mode switch flag F is not zero, then the routine proceeds to step S170 wherein the supply of electric power to the section A is cut to disable the transmitter function of the radar system 1. The routine proceeds to step S180 wherein a receiver noise measurement mode is entered to deactivate the transmitter function to transmit no radar wave, but acquire the resulting beat signal BT (which will also be referred to as a third beat signal below), as produced by the signal Sr, as derived when one of the receiver antennas CHn (i.e., the receiver antenna CHi) which is specified by the channel specifying parameter i is in connection with the amplifier 22.

Specifically, the receiver noise measurement mode is, like in the CW noise measurement mode, to output the modulation signal M whose level is kept constant to create the CW radar wave, keep the connection of one of the receiver antennas CH1 to CHn, as specified by the channel specifying parameter i with the amplifier 22 as it is for one cycle of the CW radar wave, and samples the beat signal BT a given number of times (e.g. 256 times) through the A/D converter 25.

The routine proceeds to step S190 wherein the supply of electric power to the section B is cut to disable the receiver function of the radar system 1. The routine proceeds to step S200 wherein the channel specifying parameter i is updated or incremented. Specifically, when the channel specifying parameter i is not n (i.e., i≠n), it is incremented by one (i.e., i←i+1). When the channel specifying parameter i reaches n, it is reset to one (i.e., i←1). In other words, the program of FIG. 2 is executed for all the receiver antennas CH1 to CHn.

The routine proceeds to step S210 wherein the mode switch flag F is set to zero. The routine then terminates.

FIG. 3 is a time chart which demonstrates the operation of the radar system 1 in the object detection mode.

When the mode switch flag F is zero, the CW noise measurement mode is entered following the object detection mode. Alternatively, when the mode switch flag F is one, the receiver noise measurement mode is entered following the object detection mode. Specifically, the radar operation is, as can be seen from FIG. 3, executed in every measurement cycle. The CW noise measurement operation and the receiver noise measurement operation are performed alternately.

In the object detection mode, the FMCW radar wave is transmitted from the transmitter antenna 16 for P cycles (i.e., P frequency-modulation cycles). Note that P=3 in the example of FIG. 3. A given number of data samples (e.g., 256 samples) of the beat signal BT are taken through each of all the receiver antennas CH1 to CHn in each of the modulated frequency-rising and -falling ranges of the radar wave. A total of P sets of the data samples (e.g., 3×256 samples) for each of the receiver antennas CH1 to CHn in each of the modulated frequency-rising and -falling ranges are derived through the A/D converter 25 and stored. In each of the CW noise measurement mode and the receiver noise measurement mode, a given number of data samples (e.g., 256 samples) of the beat signal BT are taken through one of the receiver antennas CH1 to CHn (i.e., the receiver channel CHi). The receiver channel CHi is changed from one to another of the receiver antennas CH1 to CHn each time each of the CW noise measurement operation and the receiver noise measurement operation is executed.

Object Information Producing Operation

The radar system 1 also serves as an object information producing apparatus in an object information producing mode. Specifically, the object information producing mode is to perform the frequency analysis (i.e., the FFT) on the data samples of the first beat signal, acquired through each of the receiver channels CH1 to CHn in the object detection mode in each of the modulated frequency-rising and -falling ranges of the radar wave. P frequency-analyzed results, as derived in each of the modulated frequency-rising and -falling ranges, are averaged to create an averaged frequency spectrum. A peak frequency component(s) whose power is greater than the peak detecting threshold, as will be described later in detail, is extracted from the averaged frequency spectrum. Using such extracted component, the object information about the distance to, the relative speed of, and the azimuth of the target object from which the peak frequency component has arisen is then calculated. This type of object information producing operation may be achieved in a typical manner known in the field of the FMCW radars, and explanation thereof in detail will be omitted here.

Threshold Determining Operation

FIG. 4 is a flowchart of a threshold determining program to be initiated each time the CW noise measurement in step S140 or the receiver noise measurement in step S180 is completed. Note that the peak detecting threshold(s) used in this program is reset in the above initialization process to the default.

After entering the program, the routine proceeds to step S310 wherein the data samples of the second beat signal or the third beat signal, as derived in the CW noise measurement mode or the receiver noise measurement mode of operation of the radar system 1, are frequency-analyzed by the FFT and then stored as a CW noise spectrum or a receiver noise spectrum.

The routine proceeds to step S320 wherein it is determined whether what has been obtained in step S310 is the CW noise spectrum or not. This determination may be achieved by checking the mode switch flag F. When the mode switch flag F is one, it represents that the CW noise measurement has been made immediately before the mode switch flag F is set to one. It is, therefore, determined in step S320 that what has been obtained in step S310 in this program execution cycle is the CW noise spectrum.

If a YES answer is obtained in step S320 meaning that the CW noise spectrum has been derived, then the routine proceeds to step S385 wherein there is a frequency component having a peak (i.e., the peak frequency component) which is greater in power than a strong reflection threshold in the CW noise spectrum or not. If a NO answer is obtained meaning that there is not peak frequency component, then the routine terminates. Alternatively, if a YES answer is obtained, then the routine proceeds to step S390 wherein the mode switch flag F is set to zero. The CW noise spectrum, as derived in step S310, is discarded. The routine then terminates.

When the mode switch flag F is set to zero in step S390, it will cause the CW noise measurement operation to be performed following the objection detection mode in the subsequent measurement cycle. Afterwards, when this program is initiated again, the CW noise spectrum for the same receiver channel CHi will be derived.

Alternatively, if a NO answer is obtained in step S320 meaning that what has been obtained in step S310 is the receiver noise spectrum, that is, that both the CW noise spectrum and the receiver noise spectrum have already been derived through the same receiver channel CHi, then the routine proceeds to step S330. In step S330, an area of the receiver noise spectrum, as derived in step S310 in this program execution cycle, where frequency components are lower in frequency than a given border frequency (e.g., 75 kHz) is extracted as a low-frequency region. Similarly, an area of the CW noise spectrum, as derived on the previous program execution cycle, where frequency components are higher in frequency than the given border frequency (e.g., 75 kHz) is extracted as a high-frequency region. The low-frequency region and the high-frequency region are combined and stored as an actual noise shape data for one of the receiver channels CH1 to CHn through which the data samples have been derived and frequency-analyzed or fast Fourier-transformed in step 310 in this program execution cycle, in other words, which has been selected in step S180.

The routine proceeds to step S340 wherein it is determined whether the actual noise shape data have been collected for all the receiver channels CH1 to CHn or not. If a NO answer is obtained, then the routine terminates. Alternatively, if a YES answer is obtained, then the routine proceeds to step S350 wherein all sets of the actual noise shape data, as acquired through all the receiver channels CH1 to CHn, are averaged with respect to each frequency (e.g., each frequency BIN) to derive channel-averaged noise shape data. The routine proceeds to step S360 wherein it is determined whether the number of the channel-averaged noise shape data, as derived in step S340, reaches a given value or not. If a NO answer is obtained, then the routine terminates. Alternatively, if a YES answer is obtained, then the routine proceeds to step S370 wherein an average (i.e., a moving-average) of a given number of latest ones of the channel-averaged noise shape data is calculated with respect to each frequency (e.g., each frequency BIN) to derive a noise reference value.

The routine proceeds to step S380 wherein offsets which are given for the peak detecting thresholds is added to some of the noise reference values lying in the high-frequency region to produce a high-frequency spectrum. 1/f noises are added to some of the noise reference values which lie in the low-frequency region and then adjusted in signal level so that signals levels thereof may continue successively to those in the high-frequency region across the border frequency, thereby producing a low-frequency spectrum. The high-frequency spectrum and the low-frequency spectrum are combined to derive updated values of the peak detecting thresholds.

The peak detecting thresholds are set to the defaults until the number of the channel-averaged noise shape data, as derived in step S340, is determined to have reach the given value. Afterwards, the values, as calculated in the above manner, are used as the peak detecting thresholds. The peak detecting thresholds are updated each time the channel-averaged noise shape data are calculated, in other words, every n measurement cycles.

FIGS. 5(a), 5(b), and 5(c) demonstrate how to determine the peak detecting thresholds in the manner, as described above. FIG. 5(a) illustrates an example of the receiver noise spectrum, as made by fast Fourier-transforming the data samples acquired in the receiver noise measurement operation. FIG. 5(b) illustrates an example of the CW noise spectrum, as made by fast Fourier-transforming the data samples acquired in the CW noise measurement operation. FIG. 5(c) illustrates an example of the peak detecting thresholds.

A high-frequency range of the peak detecting thresholds is defined by the high-frequency region of the CW noise spectrum where there is no peak frequency components. A low-frequency range of the peak detecting thresholds is defined using the low-frequency region of the receiver noise spectrum. This is because the CW noise spectrum usually includes noises transmitted directly from the transmitter antenna 16 (i.e., the leakage noises) as well as noises generated in the receiver itself (e.g., the receiver noises), but the low-frequency region thereof cannot be used to determine the peak detecting thresholds because the peak frequency component(s) usually appear, while the receiver noise spectrum has no peaks over the entire range thereof, but it does not reflect the leakage noises in determining the peak detecting threshold(s).

The averaged values of the frequency components in the high-frequency region of the CW noise spectrum, i.e., the noise reference values in the high-frequency region represent averaged values of receiver noises containing the leakage noises. In the high-frequency region, the peak detecting values are, therefore, derived by adding the offsets which are so selected as to be greater than a variation in random noise to the noise reference values (see a first distribution in FIG. 5(c)).

The averaged values of the frequency components in the low-frequency region of the receiver noise spectrum, i.e., the noise reference values in the low-frequency region represent averaged values of receiver noises not containing the leakage noises. The 1/f noises are, therefore, added to the noise reference values to estimate the waveform of the receiver noise spectrum containing the leakage noises and then adjusted in signal level so that the signals levels thereof may continue successively to those in the high-frequency region through the border frequency, thereby producing values each of which is raised by the sum of the 1/f noise and the receiver noise as the peak detecting thresholds (see a second distribution in FIG. 5(c)).

When there is a peak frequency component which is much greater in level within the low-frequency region of the CW noise spectrum (see a broken line in FIG. 5(b)), it means that phase noises broadens a base portion (which will also referred to as a lower skirt below) of the large peak frequency component, which will also raise the noise floor in the high-frequency region of the CW noise spectrum. Accordingly, when there is a peak frequency component in the low-frequency region of one of the CW noise spectrums which has a power greater than the strong reflection threshold and which would affect the frequency components in the high-frequency region, the one of the CW noise spectrums is excluded from calculation of the channel-averaged noise shape data (i.e., the noise reference values).

How to Determine Offset for Peak Detecting Threshold

Testing which is to be performed on the radar system 1 at the factory to determine the offsets and the strong reflection thresholds will be described below with reference to FIG. 6.

The testing is made with the radar system 1 placed in an echo-free environment, e.g., an anechoic chamber where there is no reflection of a radar wave transmitted from the radar system 1. The data samples, as created by performing the object detection operation in step S120 and the CW noise measurement operation in step S140 a required number of times, are used in determining the offsets and the strong reflection thresholds.

The testing is made by the signal processing unit 26, but the data samples may alternatively be loaded into an external signal processing unit or computer to calculate the offsets and the strong reflection thresholds.

Referring to the program of FIG. 6, the routine first proceeds to step S410 wherein the data samples, as acquired through each of the receiver channels CH1 to CHn in the object detection mode, are fast Fourier-transformed in each of the modulated frequency-rising and -falling ranges of the radar wave, thereby producing a plurality of frequency spectrums as FMCW noise spectrums.

The routine proceeds to step S420 wherein the data samples, as acquired through each of the receiver channels CH1 to CHn, are fast Fourier-transformed, thereby producing a plurality of CW noise spectrums.

The routine proceeds to step S430 wherein maximum values (i.e., peak levels) in the respective FMCW noise spectrums, as derived in step S410, at the respective frequencies (e.g., BINs) are extracted through, for example, a peak hold circuit to evaluate a maximum noise spectrum. The routine proceeds to step S440 wherein averaged values of the respective frequency components in the respective CW noise spectrums, as derived in step S420, are calculated to make an averaged noise spectrum.

Figure 7:
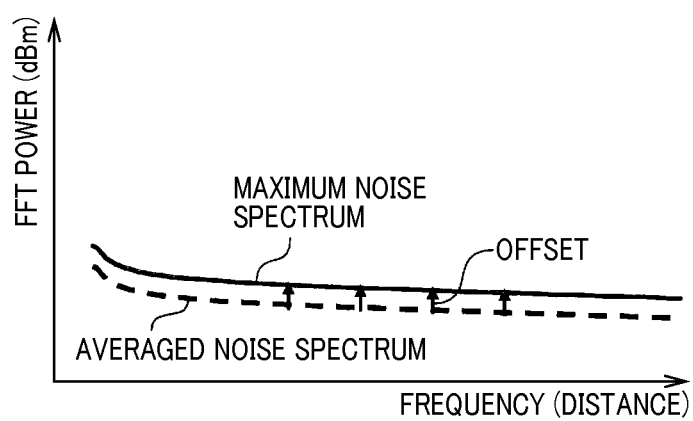
FIG. 7 is a view which show how to determine offsets for calculating peak detecting thresholds.

The routine proceeds to step S450 wherein a difference between the maximum noise spectrum, as derived in step S430, and the averaged noise spectrum, as derived in step S440, (i.e., a difference between each of the peak levels and a corresponding one of the averaged values) is, as illustrated in FIG. 7, calculated with respect to each frequency (i.e., each BIN). The differences, as derived for the respective frequencies, are determined as the offsets for use in determining the peak detecting thresholds and stored in the ROM of the signal processing unit 26.

Only a maximum of the offsets may be calculated and used for all the frequency components.

How to Determine Strong Reflection Threshold and Border Frequency

Figure 8A:
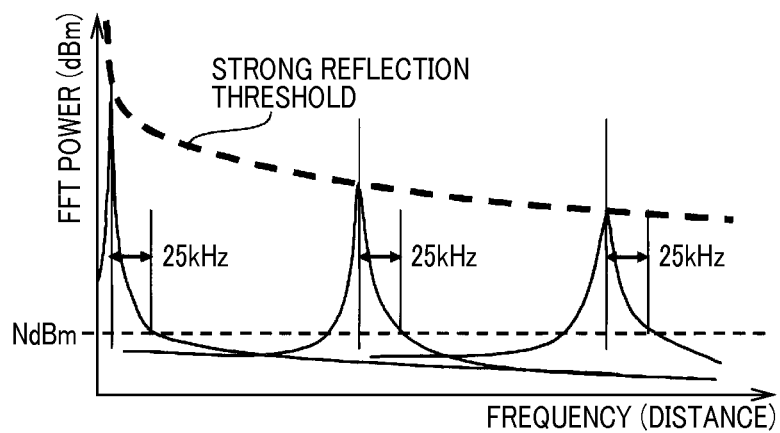
FIG. 8(a) is a view which demonstrates an example of a relation between a strong reflection threshold and peak frequency components to determine strong reflection thresholds.

FIG. 8(a) illustrates an example of a relation between the strong reflection thresholds and the peak frequency components.

In the illustrated frequency spectrum, the peak frequency components each include the lower skirt arising from the phase noises. Here, half a width of the lower skirt at a noise permissible value NdBm (i.e., a distance between a vertical center line of the peak frequency component and an intersection of the noise permissible value NdBm and a higher-frequency edge of the lower skirt) is defined as the size of the lower skirt.

The peak levels of the peak frequency components with the size of the lower skirt identical with a given permissible value (e.g., 25 kHz in FIG. 8(a)) are calculated at respective frequencies (i.e., BINs) in the manner, as taught in a paper discussed below, as the strong reflection thresholds.

In order to avoid the adverse effects of the peak frequency components whose peak levels are lower than the strong reflection thresholds on the noise floor in the high-frequency region of the CW noise spectrum, the border frequency is preferably so determined as to be greater than a CW upper limit component, as calculated from a predetermined upper limit of a relative speed between the target object and the radar system 1, by the above permissible value (i.e., 25 kHz). In the radar system 1, when the upper limit of the relative speed is 300 km/h, the frequency of the CW upper limit component is 43 kHz. The sum of 50 kH (i.e., the frequency of the CW upper limit component plus a margin) and the permissible value (i.e., 25 kHz) is defined as the border frequency (=75 kHz).

Figure 8B:
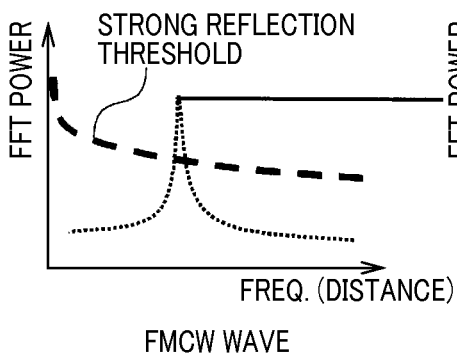
FIG. 8(b) is a view which shows a frequency spectrum created through an FMCW radar wave.
Figure 8C:
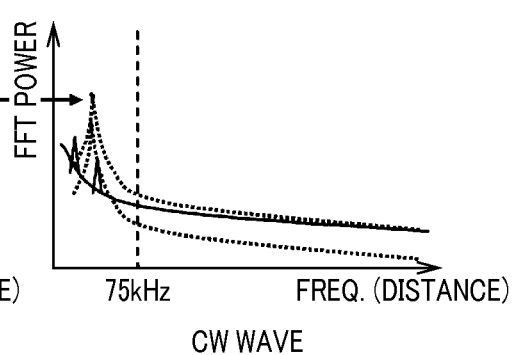
FIG. 8(c) is a view which shows a frequency spectrum created through a CW radar wave.

The peak frequency components, as appearing on the frequency spectrum (see FIG. 8(b)) arising from the FMCW radar wave, is equivalent to one which has the same peak value, but is lower than the frequency of the CW upper limit component on the frequency spectrum (see FIG. 8(c)) arising from the CW radar wave.

The size of the lower skirt of the peak frequency components is logically estimated by evaluating the waveform of a fast Fourier-transformed (FFT) beat signal (i.e., the waveform of the peak frequency components) resulting from an echo from a target object located at a given distance from the radar system 1 using a phase noise cancelation equation, as taught in, for example, the paper "The influence of Transmitter Phase Noise on FMCW Radar performance", by Patrick D L Beasley, $3^{rd}$ European Radar Conference, the whole contents of which are incorporated herein by reference.

As apparent from the above discussion, the radar system 1 works to determine the peak detecting thresholds for use in extracting the peak frequency components by adding the offsets, as derived in view of a variation in noise, to the averages of the actually measured frequency components in the high-frequency region of the CW noise spectrum which is higher than the border frequency and on which the leakage noises as well as the receiver noises reflect and also by estimating the waveform of a noise spectrum in the low-frequency region of the receiver noise spectrum from the actually measured frequency components in the received signal noise spectrum and the 1/f noise spectrum and adjusting the levels of the noise components in the low-frequency region so as to continue to those in the high-frequency region.

Consequently, the radar system 1 is operable to determine the peak detecting thresholds on which the effects of the noises are reflected over the entire frequency band within which the peak frequency components need to be detected in the object detection mode, thus resulting in increased accuracy in acquiring the peak frequency components or information about the target object which has reflected the radar wave.

When there is the peak frequency component whose power is greater than the strong reflection threshold in one of the CW noise spectrums, data derived from that CW noise spectrum is not used in determining the peak detecting thresholds, thus preventing the peak detecting thresholds from having undesirably great values due to the effects of the peak frequency component of a very large power whose lower skirt extends into the high-frequency region of the CW noise spectrum.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For instance, the CW noise measurement operation and the receiver noise measurement operation are performed in different ones of the measurement cycles, but they may alternatively be performed sequentially in the same measurement cycle.

Each of the CW noise measurement operation and the receiver noise measurement operation is performed in one of the measurement cycles to derive the data samples through only one of the receiver channels CH1 to CHn, but may be made to produce the data samples through some or all of the receiver channels CH1 to CHn.

In the case where a variation in noise of the received signal Sr is small or a temperature-dependent drift thereof is small, a pre-calculated determined single received signal noise spectrum or a plurality of received signal noise spectrums pre-calculated for the respective receiver channels CH1 to CHn may be used without performing the receiver noise measurement operation.

In the case where the received signal noise spectrums change at substantially a constant rate with a change in ambient temperature, one received signal noise spectrum may be corrected by that rate and the ambient temperature to determine the peak detecting thresholds without creating a plurality of receiver noise spectrums.

The radar system 1 adds the offsets to the noise reference values lying in the high-frequency region, but may alternatively be designed to add the offsets to the received noise shape data or the channel-averaged noise shape data.

The programs in FIGS. 2, 4, and 6 may be stored in a computer readable storage medium (e.g., a non-transitory medium). The medium may be, for example but not limited to, an electric, magnetic, optical, infrared or semiconductor system, device or transmission medium.

The programs in the storage medium may be installed in a computer and executed to realize the radar system 1.

What is claimed is:

1. A method of determining a peak detecting threshold which is used by a frequency modulated continuous wave FMCW radar, the method comprising:
    detecting a peak frequency component which appears as representing a target object in a frequency spectrum derived by frequency-analyzing a first beat signal that is a beat signal developed by a FMCW radar wave transmitted from a transmitter of the FMCW radar and a reflection of the FMCW radar wave from the target object received by a receiver of the FMCW radar using a processor, wherein the FMCW radar wave is a frequency modulated continuous wave that has a varying frequency;

producing a second beat signal that is a beat signal created by transmitting a CW radar wave through the transmitter of the FMCW radar and receiving a reflection of the CW radar wave using the receiver of the FMCW radar, wherein the CW radar wave is a continuous wave that has a fixed frequency and is different from the FMCW radar wave;

frequency-analyzing, using the processor, the second beat signal to create a frequency spectrum as a CW noise spectrum and defining, as a CW upper limit component, a peak frequency component which appears in the CW noise spectrum and arises from the reflection of the CW radar wave from an object having a predetermined upper limit of a relative speed to the radar;

adding an offset, using the processor, to frequency components in a high-frequency region of the CW noise spectrum which is higher than the CW upper limit component to define a first distribution; and determining, using the processor, the first distribution as a value of the peak detecting threshold.

2. A method as set forth in claim 1, further comprising:
placing the transmitter and the receiver in an echo-free environment prior to detecting the peak frequency component;
transmitting the FMCW radar wave using the transmitter;
receiving an echo of the FMCW radar wave received by the receiver to produce and frequency-analyzing a beat signal to develop a frequency spectrum as a FMCW noise spectrum;
holding peak levels in the FMCW noise spectrum at respective frequencies;
transmitting the CW radar waves in the echo-free environment using the transmitter;
receiving echoes of the CW radar waves using the receiver to produce and frequency-analyzing beat signals to develop a plurality of frequency spectrums as CW noise spectrums;
calculating averaged values in the CW noise spectrums at respective frequencies; and
determining, as the offset, a difference between each of the peak levels of the FMCW noise spectrum and one of the averaged values of the CW noise spectrums at the respective frequencies.

3. A method as set forth in claim 1, further comprising:
deactivating the transmitter while activating the receiver to produce a beat signal as a third beat signal;
frequency-analyzing the third beat signal to create a frequency spectrum as a receiver noise spectrum;
adding a 1/f noise to the receiver noise spectrum in a low-frequency region lower than the CW upper limit component;
adjusting a level of the receiver noise spectrum to which the 1/f noise is added to develop a second distribution successively continuing to the first distribution; and
determining the second distribution as a value of the peak detecting threshold in the low-frequency region.

4. An object information producing apparatus comprising:
a measurement operation unit configured to frequency-analyze a first beat signal and a second beat signal, wherein:
the first beat signal is a beat signal created by transmitting an FMCW radar wave through a transmitter and the measurement operation unit receives a reflection of the FMCW radar wave through a receiver of a radar to produce a frequency spectrum, the FMCW radar wave is a frequency modulated continuous wave that has a varying frequency, and
the second beat signal is a beat signal created by transmitting a CW radar wave through the transmitter and the measurement operation unit receives a reflection of the CW radar wave through the receiver to produce a frequency spectrum as a CW noise spectrum, the CW radar wave is a continuous wave that has a fixed frequency and is different from the FMCW radar wave;
a peak detecting unit configured to detect a peak frequency component which is greater than a given peak detecting threshold from the frequency spectrum, as derived by the measurement operation unit;
a threshold determining unit configured to determine the peak detecting threshold based on the CW noise spectrum, the threshold determining unit defining, as a CW upper limit component, a peak frequency component which appears in the CW noise spectrum and arises from the reflection of the CW radar wave from an object having a predetermined upper limit of a relative speed to the radar, the threshold determining unit adding an offset to frequency components in a high-frequency region of the CW noise spectrum which is higher than the CW upper limit component to define a first distribution, the threshold determining unit determining the first distribution as a value of the peak detecting threshold; and
a target object information producing unit configured to produce information about a target object reflecting the FMCW radar wave based on the peak frequency component, as detected by the peak detecting unit.

5. An object information producing apparatus as set forth in claim 4, wherein:
the measurement operation unit deactivates the transmitter while activating the receiver to produce a beat signal as a third beat signal and frequency-analyzes the third beat signal to create a frequency spectrum as a receiver noise spectrum, and
the threshold determining unit adds a 1/f noise to the receiver noise spectrum in a low-frequency region lower than the CW upper limit component, adjusts a level of the receiver noise spectrum to which the 1/f noise is added to develop a second distribution successively continuing to the first distribution, and determines the second distribution as a value of the peak detecting threshold in the low-frequency region.

6. An object information producing apparatus as set forth in claim 4, wherein the measurement operation unit transmits, via the transmitter, the CW radar wave a given number of times to produce a plurality of the CW noise spectrums and averages frequency components of the CW noise spectrums to develop a frequency spectrum which is used in the peak detecting threshold, wherein when one of the CW noise spectrums includes a peak frequency component whose lower skirt extends into the high-frequency region, the one of the CW noise spectrums is excluded from development of the frequency spectrum used in the peak detecting threshold.

7. A non-transitory computer readable storage medium storing a computer program which is used by a frequency modulated continuous wave FMCW radar, the program comprising instructions to perform the steps of:
detecting a peak frequency component which appears as representing a target object in a frequency spectrum derived by frequency-analyzing a first beat signal that is a beat signal developed by an FMCW radar wave transmitted from a transmitter of the FMCW radar and a reflection of the FMCW radar wave from the target object received by a receiver of the FMCW radar using a processor, wherein the FMCW radar wave is a frequency modulated continuous wave that has a varying frequency;

determining a peak detecting threshold which is used by the FMCW radar in detecting the peak frequency component which appears as representing the target object in the frequency spectrum derived by the frequency-analyzing of the first beat signal that is the beat signal developed by the FMCW radar wave transmitted from the transmitter of the FMCW radar and the reflection of the FMCW radar wave from the target object received by the receiver of the FMCW radar;

producing a second beat signal that is a beat signal created by transmitting a CW radar wave through the transmitter and receiving a reflection using the receiver, wherein the CW radar wave is a continuous wave that has a fixed frequency and is different from the FMCW radar wave;

frequency-analyzing the second beat signal to create a frequency spectrum as a CW noise spectrum and defining, as a CW upper limit component, a peak frequency component which appears in the CW noise spectrum and arises from the reflection of the CW radar wave from an object having a predetermined upper limit of a relative speed to the radar;

adding an offset to frequency components in a high-frequency region of the CW noise spectrum which is higher than the CW upper limit component to define a first distribution; and determining the first distribution as a value of a peak detecting threshold.

8. A non-transitory computer readable storage medium, as set forth in claim 7, wherein the instructions also include steps of, transmitting the FMCW radar wave;

receiving an echo of the FMCW radar wave to produce and frequency-analyzing a beat signal to develop a frequency spectrum as an FMCW noise spectrum when the transmitter and the receiver are placed in an echo-free environment prior to performing instructions of the program;

holding peak levels in the FMCW noise spectrum at respective frequencies;

transmitting the CW radar waves in the echo-free environment;

receiving echoes of the CW radar waves to produce and frequency-analyzing beat signals to develop a plurality of frequency spectrums as CW noise spectrums;

calculating averaged values in the CW noise spectrums at respective frequencies; and determining, as the offset, a difference between each of the peak levels of the FMCW noise spectrum and one of the averaged values of the CW noise spectrums at the respective frequencies.

9. A non-transitory computer readable storage medium, as set forth in claim 7, wherein the instructions also include steps of:

deactivating the transmitter while activating the receiver to produce a beat signal as a third beat signal;

frequency-analyzing the third beat signal to create a frequency spectrum as a receiver noise spectrum;

adding a 1/f noise to the receiver noise spectrum in a low-frequency region lower than the CW upper limit component;

adjusting a level of the receiver noise spectrum to which the 1/f noise is added to develop a second distribution successively continuing to the first distribution; and determining the second distribution as a value of the peak detecting threshold in the low-frequency region.

10. A non-transitory computer readable storage medium, as set forth in claim 7, wherein the instructions also include a step of producing information about the target object reflecting the FMCW radar wave based on the peak frequency component.

11. A non-transitory computer readable storage medium, as set forth in claim 10, wherein the information about the target object includes at least one of a distance to the target object, a relative speed of the target object, or an azimuth of the target object.

12. An object information producing apparatus as set forth in claim 4, wherein the information produced by the target object information producing unit includes at least one of a distance to the target object, a relative speed of the target object, or an azimuth of the target object.

* * * * *